US011868071B2

(12) United States Patent
Seki

(10) Patent No.: US 11,868,071 B2
(45) Date of Patent: Jan. 9, 2024

(54) IMAGE FORMING APPARATUS

(71) Applicant: CANON KABUSHIKI KAISHA, Tokyo (JP)

(72) Inventor: Hirotaka Seki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/988,823

(22) Filed: Nov. 17, 2022

(65) Prior Publication Data

US 2023/0074291 A1 Mar. 9, 2023

Related U.S. Application Data

(62) Division of application No. 17/375,172, filed on Jul. 14, 2021, now Pat. No. 11,520,264.

(30) Foreign Application Priority Data

Jul. 20, 2020 (JP) ................................ 2020-123903

(51) Int. Cl.

*G03G 15/00* (2006.01)
*G03G 15/23* (2006.01)

(52) U.S. Cl.

CPC ....... *G03G 15/5041* (2013.01); *G03G 15/234* (2013.01); *G03G 15/5058* (2013.01); *G03G 15/5062* (2013.01)

(58) Field of Classification Search

CPC ............. G03G 15/234; G03G 15/5041; G03G 15/5058; G03G 15/5062

See application file for complete search history.

(56) References Cited

U.S. PATENT DOCUMENTS

| | | | |
|---|---|---|---|
| 8,681,371 | B2 | 3/2014 | Hirose |
| 8,712,292 | B2 | 4/2014 | Kobayashi et al. |
| 8,964,246 | B2 | 2/2015 | Sakatani |
| 2011/0076045 | A1 | 3/2011 | Sobue |
| 2013/0114968 | A1 | 5/2013 | Shida et al. |
| 2014/0036317 | A1 | 12/2014 | Tomita et al. |

*Primary Examiner* — Hoang X Ngo

(74) *Attorney, Agent, or Firm* — VENABLE LLP

(57) ABSTRACT

An image forming apparatus includes an image forming unit configured to form an image on a sheet based on image forming condition, a reader configured to convey the sheet and read a test image on the sheet while the sheet is conveyed, and a controller configured to control the image forming unit to form the image and the test image on a same sheet, control the reader to read the test image on the same sheet, and generate the image forming condition for adjusting a density of an image to be formed by the image forming unit, based on a reading result of the test image by the reader.

20 Claims, 9 Drawing Sheets

IMAGE FORMING APPARATUS

This application is a continuation of application Ser. No. 17/375,172, filed Jul. 14, 2021.

BACKGROUND OF THE INVENTION

Field of the Invention

The present disclosure relates to a technology for stabilizing image quality of an image formed by an image forming apparatus.

Description of the Related Art

An image forming apparatus using an electronic photograph process forms an image on a recording paper to generate a printed material by each process of charging, exposing, developing, transferring, and fixing. The toner image formed by each process of charging, exposing, and developing is transferred on a recording paper by the transferring process to fix the toner image by the process of fixing. As to the image forming apparatus, characteristics of the processes may vary due to temporal changes in parts and changes in an environment. The changes in the characteristics of each process cause changes in the image quality such as image density of images on recording paper, therefore, in general, the image forming apparatus performs a process called an image stabilization control. In the image stabilization control, a detection image for detecting the image density is formed on a photosensitive drum or an intermediate transfer belt, and an image forming condition is adjusted for obtaining an appropriate image density based on the reading result of the detection image by an optical sensor. The image forming condition includes, for example, an amount of charge during a charging process, or an amount of light emission energy of a laser beam during the process of exposing and the like.

The image stabilization control is performed using the image density detected from the detection image, which is a toner image before transferred to the recording paper. Therefore, an influence on the image density of the process after the transfer process is not controlled by the image stabilization control. For example, the effect of environmental fluctuations on transfer efficiency during the transfer process cannot be adjusted by the image stabilization control. Thus, the conventional image stabilization control cannot suppress the variation in the image density of the image finally formed on the recording paper. On the other hand, U.S. Pat. No. 8,964,246 B2 describes an image forming apparatus in which a detection image is formed on a recording paper, and an image forming condition is adjusted, based on the result of reading the detection image formed on the recording paper, for obtaining an appropriate image density of the image formed on the recording paper.

Some image forming apparatuses can perform double-sided printing to form images on both sides of the recording paper. When the detection image is formed on both sides of the recording paper to detect the image density, a detection image formed on a first surface may affect image density, chromaticity, and a spectral value detection accuracy of a detection image formed on the second surface, which is different from the first surface. On the other hand, U.S. Pat. No. 8,681,371 B2 describes an image forming apparatus which forms a detection image on a first surface of recording paper and forms, on the second surface, a detection image having an image density higher than the detection image formed on the first surface. Thus, in the image forming apparatus described in U.S. Pat. No. 8,681,371 B2, the detection image formed on the second surface is read while suppressing the influence of show-through.

As to the recording paper, a detection image may be printed on the first side, and an image corresponding to a print job (hereinafter, referred to as "user image") may be printed on the second side. In this case, the influence of show-through of the user image occurs in an area where the detection image on the first surface is printed. As a result, the image density detected from the detection image on the first surface is affected by the user image, and the detection accuracy may be decreased. The decrease in the detection accuracy of the detection image hinders the appropriate adjustment of an image forming condition. In view of the above, one object of the present invention is to provide an image forming apparatus which can detect a detection image with high accuracy even when performing double-sided printing.

SUMMARY OF THE INVENTION

The image forming apparatus according to the present disclosure includes: an image forming unit configured to form an image on a sheet based on an image forming condition; a reader configured to convey the sheet, and read a test image on the sheet while the sheet is conveyed; and a controller configured to: control the image forming unit to form the image and the test image on a same sheet; control the reader to read the test image on the same sheet; and generate the image forming condition for adjusting a density of an image to be formed by the image forming unit, based on a reading result of the test image by the reader, wherein, in a case where the test image is formed at a print job in which the image forming unit forms images on both surfaces of a sheet, the controller controls the image forming unit to form the test image on a first surface of the sheet without forming the test image on a second surface of the sheet opposite to the first surface of the sheet, wherein, in a case where the second image on the second surface overlaps a back side of a test image area in which the test image is formed, the second image on the second surface has a blank area that corresponds to the back side of the test image area of the first surface, and wherein the blank area has no image.

Further features of the present invention will become apparent from the following description of exemplary embodiments (with reference to the attached drawings).

DESCRIPTION OF THE EMBODIMENTS

At least one embodiment of the present disclosure is described below in detail with reference to the drawings. It should be noted that the following embodiments are not intended to limit the scope of the invention described in the attached claims, and not all combinations of the features described in the embodiments are essential for means for solving the invention.

<Print System>

Figure 1:
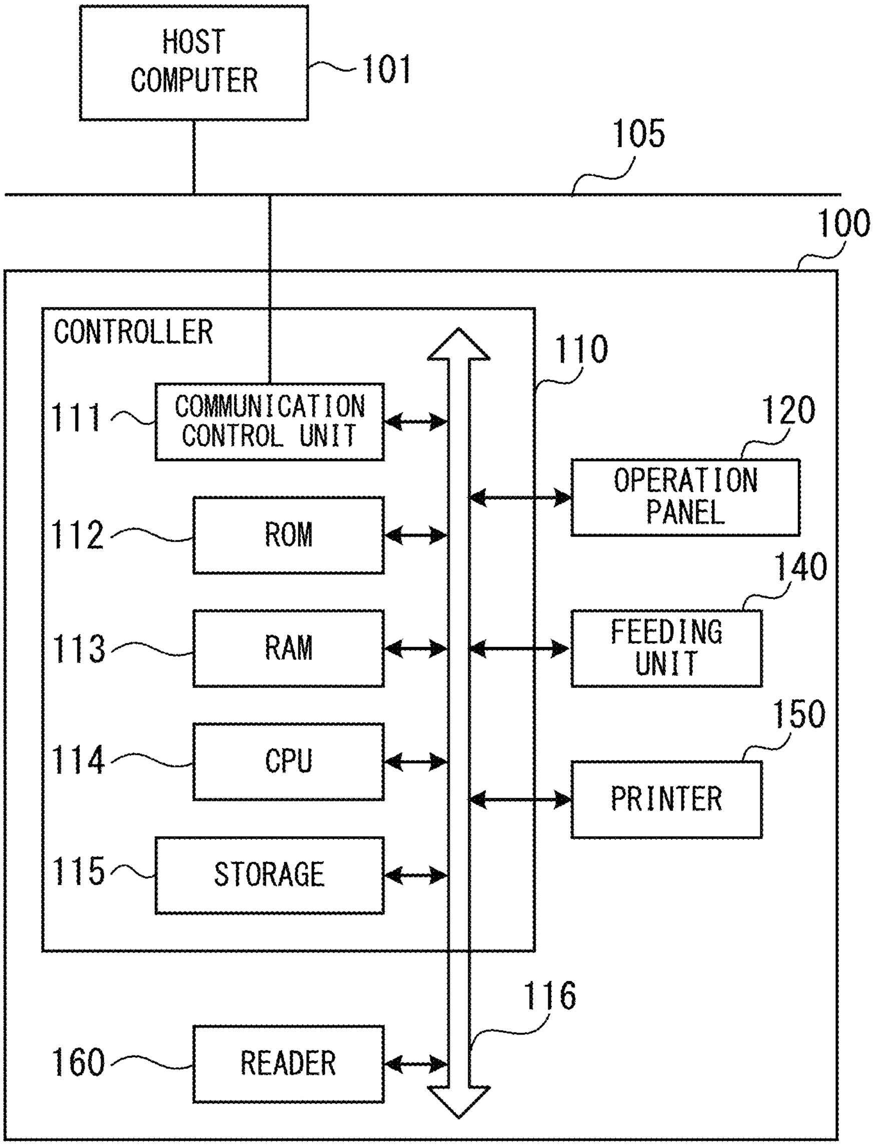
FIG. 1 is an explanatory configuration diagram of a print system.

FIG. 1 is an explanatory configuration diagram of a print system including an image forming apparatus of the present embodiment. The print system includes an image forming apparatus 100 and a host computer 101. The image forming apparatus 100 and the host computer 101 are communicably connected to each other via the network 105. The network 105 is, for example, a communication line such as a LAN (Local Area Network), a WAN (Wide Area Network), or a public communication line. A plurality of the image forming apparatuses 100 and a plurality of the host computers 101 may be connected to the network 105, respectively.

The host computer 101 is, for example, a server apparatus, and is configured to transmit a print job to the image forming apparatus 100 via the network 105. The print job includes various information necessary for printing such as image data, a type of recording paper used for printing, the number of sheets to be printed, and instructions for double-sided or single-sided printing.

The image forming apparatus 100 includes a controller 110, an operation panel 120, a feeding unit 140, a printer 150, and a reader 160. The image forming apparatus 100 controls the operation of the printer 150 based on the print job obtained from the host computer 101, and forms an image corresponding to the image data on the recording paper. The controller 110, the operation panel 120, the feeding unit 140, the printer 150, and the reader 160 are communicably connected to each other via the system bus 116.

The controller 110 controls the operation of each unit of the image forming apparatus 100. The controller 110 is an information processing device including a ROM (Read Only Memory) 112, a RAM (Random Access Memory) 113, and a CPU (Central Processing Unit) 114. The controller 110 includes a communication control unit 111 and a storage 115. Each module is communicably connected to each other via the system bus 116.

The communication control unit 111 is a communication interface which communicates with the host computer 101 and other devices via the network 105. The storage 115 is a large-capacity storage device such as an HDD (Hard Disk Drive), SSD (Solid State Drive), or the like. The storage 115 stores various data used for a computer program and an image forming process (printing process). The CPU 114 executes a computer program stored in the ROM 112 or the storage 115 to control the operation of the image forming apparatus 100. The RAM 113 provides a work area for the CPU 114 to execute a computer program.

The operation panel 120 is a user interface having an input interface and an output interface. The input interface includes, for example, an operation button, a numeric keypad, a touch panel, and the like. The output interface includes, for example, a display such as an LCD (Liquid Crystal Display), a speaker, and the like. The user can input a print job, a command, a print setting, and the like to the image forming apparatus 100 using the operation panel 120. The operation panel 120 displays the setting screen and the status of the image forming apparatus 100 on the display.

The feeding unit 140 includes a plurality of sheet feeding cassettes, which will be described later, for accommodating recording paper. The feeding unit 140 feeds a paper from a sheet feeding cassette which accommodates papers of the type of recording paper specified in the print job. A plurality of recording papers (a bundle of recording papers) are stored in the sheet feeding cassette, and the paper is fed in order from the topmost recording paper. The feeding unit 140 conveys the recording paper fed from the sheet feeding cassette to the printer 150. Each of the sheet feeding cassettes may accommodate the recording papers of the same type, however, it may accommodate different types of recording paper.

The printer 150 prints an image on the recording paper fed from the feeding unit 140 based on image data included in the print job to generate a printed material. The reader 160 is an image reading apparatus which reads an image from the printed material generated by the printer 150 and transmits the reading result to the controller 110. The image read by the reader 160 is an image (the detection image) for adjusting an image forming condition in a case where the printer 150 forms an image. The controller 110 detects the state of the image such as the image quality from the reading result of the detection image read by the reader 160, and adjusts the image forming condition based on the state of the detected image. In the present embodiment, the image density is detected from the detection image, and the image forming condition is adjusted based on the detected image density.

<The Image Forming Apparatus>

Figure 2:
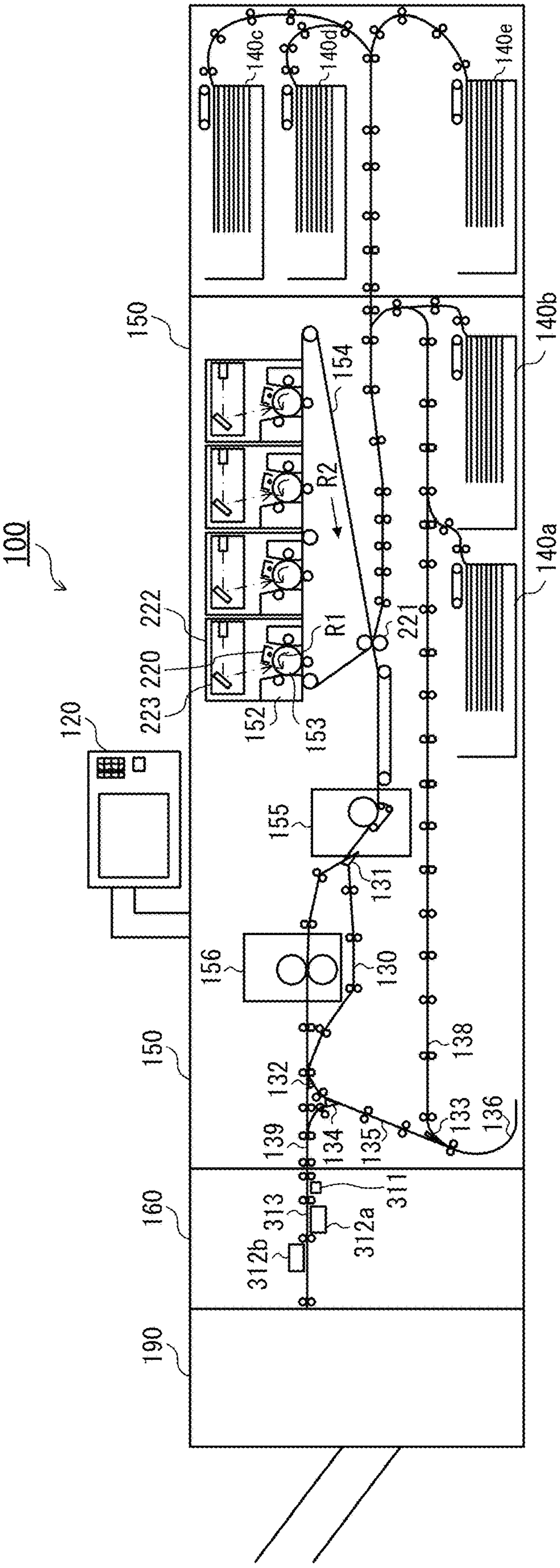
FIG. 2 is a configuration diagram of an image forming apparatus.

FIG. 2 is a configuration diagram of the image forming apparatus 100. The image forming apparatus 100 includes a sheet feeding cassettes 140*a* to 140*e*, a printer 150, a reader 160, and a finisher 190 in this order from the upstream side in the conveyance direction of the recording paper. The sheet feeding cassettes 140*a* to 140*e* constitute the feeding unit 140. Here, the finisher 190 is a post-processing device which performs post-processing of the printed material printed by the printer 150. The finisher 190 performs, for example, a stapling process or a sorting process to a plurality of printed materials, or a cutting process of a region where a detection image, which is described later, is formed.

The printer 150 includes a plurality of image forming units which form images of different colors. The printer 150 of the present embodiment includes four image forming units for forming images of four colors of yellow, magenta, cyan, and black. Each image forming unit only differs in the color of the image to be formed, and performs the same operation with the same configuration.

One image forming unit includes a photosensitive drum 153, a charger 220, an exposure device 223, and a developer 152. The photosensitive drum 153 is a drum-shaped photosensitive member having a photosensitive layer on its surface, and is rotationally driven by a motor (not shown) in the direction of arrow R1. The charger 220 charges the surface (photosensitive layer) of the rotating photosensitive drum 153. The exposure device 223 exposes the charged surface of the photosensitive drum 153 with a laser beam. The laser beam scans the surface of the photosensitive drum 153 in an axial direction of the photosensitive drum 153. The direction in which the laser beam scans the surface of the photosensitive drum 153 is a main scanning direction of the printer 150 (depth direction in FIG. 2). Thus, the electrostatic latent image is formed on the surface of the photosensitive drum 153. The developer 152 develops the electrostatic latent image using a developer (toner). Thereby an image (the toner image) in which the electrostatic latent image is visualized is formed on the surface of the photosensitive drum 153.

The printer 150 includes the intermediate transfer belt 154 on which the toner image generated by each image forming unit is transferred. The intermediate transfer belt 154 is rotationally driven in the direction of arrow R2. The toner image of each color is transferred at a timing corresponding to the rotation of the intermediate transfer belt 154. As a result, a full-color toner image in which the toner images of each color are superimposed is formed on the intermediate transfer belt 154. By the rotation of the intermediate transfer belt 154, the full-color toner image is conveyed to a nip portion formed by the intermediate transfer belt 154 and the transfer roller 221. The full-color toner image is transferred to the recording paper by the nip portion.

The recording papers are accommodated in the sheet feeding cassettes 140*a*, 140*b*, 140*c*, 140*d*, 140*e* of the feeding unit 140, and the recording paper is fed according to the timing of image formation by each image forming unit. The sheet feeding cassette which feeds the recording paper is specified by the print job. The recording paper is conveyed to the nip portion at the timing when the full-color toner image is conveyed to the nip portion. As a result, the toner image is transferred to a predetermined position on the recording paper. The conveyance direction of the recording paper is the sub-scanning direction orthogonal to the main scanning direction.

The printer 150 includes a first fixing unit 155 and a second fixing unit which fix the toner image on the recording paper by heating and pressurizing. The first fixing unit 155 includes a fixing roller in which a heater is installed and a pressure belt for pressing the recording paper against the fixing roller to thereby contact the recording paper with the fixing roller. The fixing roller and the pressure belt are driven by a motor (not shown) to sandwich and convey the recording paper. The second fixing unit 156 is arranged on the downstream side of the first fixing unit in the conveyance direction of the recording paper. The second fixing unit 156 is used to increase the gloss of the image on the recording paper which has passed the first fixing unit 155 and to secure the fixing characteristic. The second fixing unit 156 includes a fixing roller in which a heater is installed and a pressure roller in which a heater is installed. Depending on a type of recording paper, the second fixing unit 156 may not be used. In this case, the recording paper is not conveyed to the second fixing unit 156, rather, it is conveyed to the sheet conveyance path 130. Therefore, on the downstream side of the first fixing unit 155, a flapper 131 to guide the recording paper to either the sheet conveyance path 130 or the second fixing unit 156 is provided.

The sheet conveyance path 135 and the discharge path 139 are provided on the downstream side of the second fixing unit 156 and on the downstream side of the position where the sheet conveyance path 130 is merged. Therefore, a flapper 132 to guide the recording paper to either the sheet conveyance path 135 or the discharge path 139 is provided at a position where the sheet conveyance path 130 is merged on the downstream side of the second fixing unit 156. For example, in the double-sided printing mode, the flapper 132 guides the recording paper on which the image has been formed on a first surface to the sheet conveyance path 135. For example, in the face-up paper discharge mode, the flapper 132 guides the recording paper on which the image has been formed on the first surface to the discharge path 139. The flapper 132 guides the recording paper on which the image has been formed on the first surface to the sheet conveyance path 135, for example, in the face-down output mode.

The recording paper conveyed to the sheet conveyance path 135 is conveyed to the reversing section 136. The recording paper conveyed to the reversing section 136 is switched back to reverse the conveyance direction after the conveying operation is temporarily stopped. The recording paper is guided from the reversing section 136 to one of the sheet conveyance path 135 and the sheet conveyance path 138 by the flapper 133.

For example, the flapper 133 guides the switched back recording paper to the sheet conveyance path 138 in order to print an image on a second side in the double-sided printing mode. The recording paper conveyed to the sheet conveyance path 138 is conveyed toward the nip portion between the intermediate transfer belt 154 and the transfer roller 221. As a result, the front and back sides of the recording paper when passing through the nip portion are reversed, and an image is formed on the second surface.

For example, in the face-down output mode, the flapper 133 guides the switched back recording paper to the sheet conveyance path 135. The recording paper conveyed to the sheet conveyance path 135 by the flapper 133 is guided to the discharge path 139 by the flapper 134.

The recording paper on which the image is formed by the printer 150 is conveyed from the discharge path 139 to the reader 160. The reader 160 reads a user image printed on the recording paper according to the print job and detection image for detecting image density of a printed image. The recording paper conveyed from the printer 150 to the reader 160 is conveyed to a sheet conveyance path 313 in the reader 160. The reader 160 includes a document detection sensor 311 and line sensor units 312*a* and 312*b* along the sheet conveyance path 313. The reader 160 reads the detection image by the line sensor units 312*a* and 312*b* while conveying the recording paper along the sheet conveyance path 313. Details of the recording paper on which the detection image is printed will be described later.

The document detection sensor 311 is, for example, an optical sensor having a light emitting element and a light receiving element. The document detection sensor 311 detects a tip of the recording paper to be conveyed through the sheet conveyance path 313 in the conveying direction. The detection result of the tip of the recording paper by the document detection sensor 311 is transmitted to the controller 110. The controller 110 starts a reading operation by the reader 160 (line sensor units 312*a* and 312*b*) based on a detection timing of the tip of the recording paper by the document detection sensor 311.

The detection image can be printed on both the first and second sides of the recording paper. The line sensor units 312*a* and 312*b* are provided at positions sandwiching the sheet conveyance path 313 in order to read the detection image on both sides of the recording paper in one conveyance. When performing image density adjustment, the image forming apparatus 100 reads the detection image by the line sensor units 312*a* and 312*b* to detect the image density of the detection image on both sides of the recording paper from the reading result. To obtain appropriate density of images printed on the recording paper, the controller 110 controls the image formation process by adjusting the image forming condition based on the detection result of the image density.

<Reader>

Figure 3:
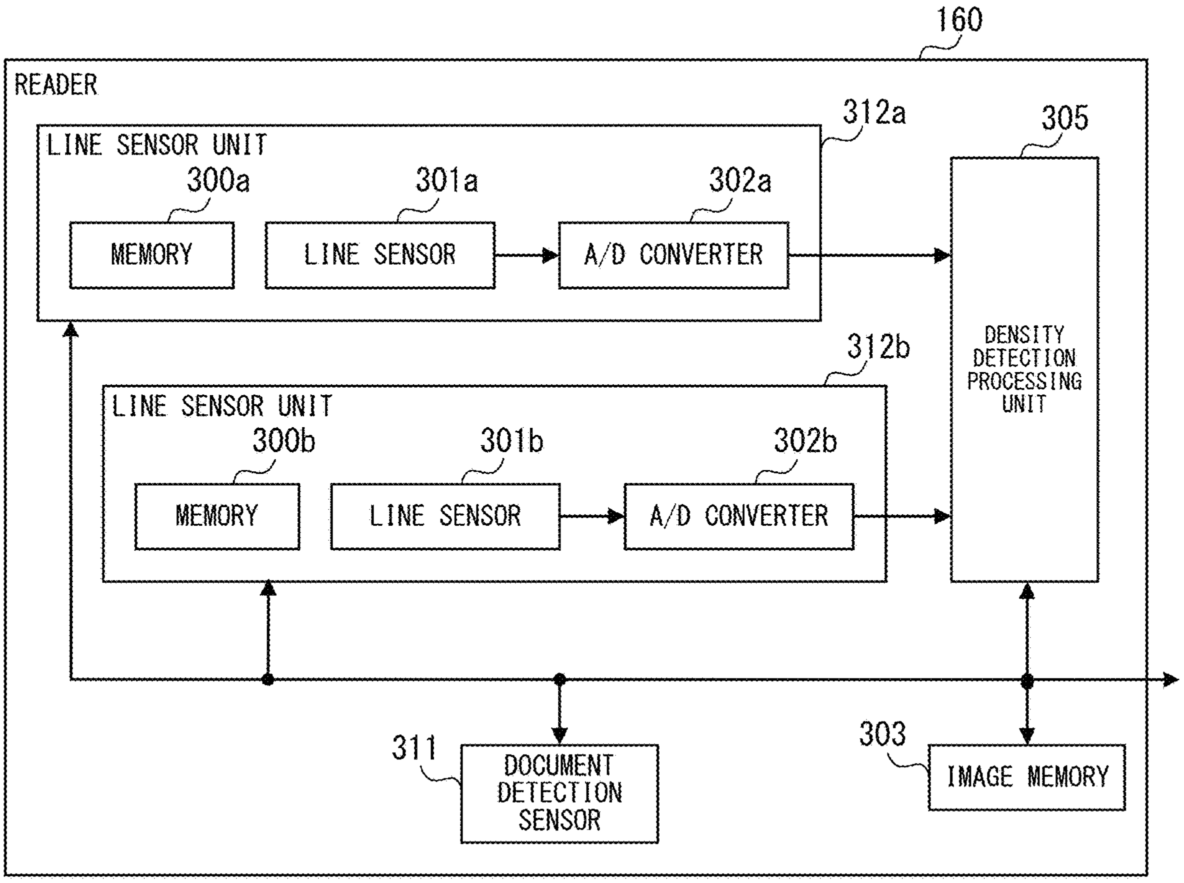
FIG. 3 is an explanatory configuration diagram of a reader.

FIG. 3 is an explanatory configuration diagram of the reader 160. The reader 160 includes, in addition to the line sensor units 312*a* and 312*b* and the document detection sensor 311, an image memory 303 and the density detection processing unit 305. The operations of the line sensor units 312*a* and 312*b*, the image memory 303, the density detection processing unit 305, and the document detection sensor 311 are controlled by the CPU 114 of the controller 110.

The line sensor unit 312*a* includes a line sensor 301*a*, a memory 300*a*, and an AD converter 302*a*. The line sensor unit 312*b* includes a line sensor 301*b*, a memory 300*b*, and an AD converter 302*b*. The line sensors 301*a* and 301*b* are, for example, CISs (Contact Image Sensor). In the memories 300*a* and 300*b*, correction information for variation in the amount of light between pixels of the corresponding line sensors 301*a* and 301*b*, a difference between the pixels, and a distance between the pixels, and the like are stored.

The AD converters 302*a* and 302*b* obtain an analog signal which is a reading result by the corresponding line sensors 301*a* and 301*b*. The AD converters 302*a* and 302*b* convert the obtained analog signal into a digital signal to transmit it to the density detection processing unit 305. The digital signal is image data of R (red), G (green), and B (blue). The density detection processing unit 305 calculates an RGB average luminance value of the detection image from the image data of RGB and transmits it to the CPU 114. The density detection processing unit 305 includes FPGA (Field-Programmable Gate Array), ASIC (Application Specific Integrated Circuit), or the like. The image memory 303 stores image data necessary for image processing in the CPU 114.

Figure 4:
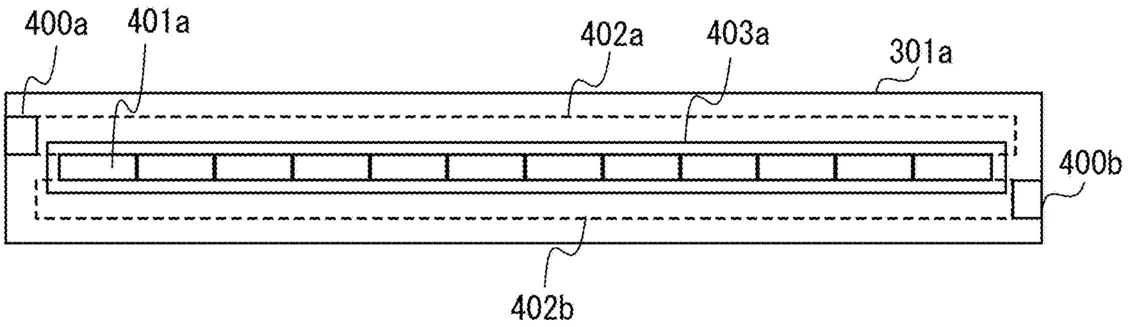
FIG. 4 is an explanatory configuration diagram of a line sensor.

FIG. 4 is an explanatory configuration diagram of the line sensor 301*a*. The line sensor 301*a* includes light emitting units 400*a* and 400*b*, light guide members 402*a* and 402*b*, a lens array 403*a*, and a sensor chip group 401*a*. The line sensor 301*a* is a rectangular parallelepiped and reads an image with the longitudinal direction as the main scanning direction. The line sensor 301*b* has the same configuration.

The light emitting units 400*a* and 400*b* are the light sources composed of, for example, LEDs (Light Emitting Diodes) which emits white light. A light emitting unit 400*a* is arranged at the end of the light guide member 402*a*, and the light emitted from the light emitting unit 400*a* is irradiated toward the recording paper. A light emitting unit 400*b* is arranged at the end of the light guide member 402*b*, and the light emitted from the light emitting unit 400*b* is irradiated toward the recording paper. The light guide members 402*a* and 402*b* are formed linearly in the main scanning direction. Therefore, the line sensor 301 irradiates the recording paper in a straight line in the main scanning direction. The main scanning direction of the line sensor unit 312*a* and the main scanning direction of the printer 150 are the same.

The lens array 403*a* guides a reflected light of the light emitted from the light emitting units 400*a* and 400*b* of the recording paper to the sensor chip group 401*a*. The sensor chip group 401*a* includes a plurality of photoelectric conversion elements (sensor chips) arranged in a straight line in the main scanning direction. One sensor chip reads one pixel image. A plurality of sensor chips have a three-line configuration. One line is coated with an R (red) color filter, another line is coated with a G (green) color filter, and yet another line is coated with a B (blue) color filter. The light guided by the lens array 403*a* is imaged on a light receiving surface of each sensor chip of the sensor chip group 401*a*.

The light emitted from the light emitting units 400*a* and 400*b* diffuses inside the light guide members 402*a* and 402*b*, and is emitted from a portion having a curvature to irradiate the entire area of the main scanning direction of the recording paper. The light guide member 402*a* and the light guide member 402*b* are arranged to sandwich the lens array 403*a* in the sub-scanning direction orthogonal to the main scanning direction. Therefore, the line sensor 301*a* has a two-sided illumination configuration which irradiates the lens array 403*a* (image reading line) with light from two directions in the sub-scanning direction. The sub-scanning direction of the line sensor unit 312*a* and the sub-scanning direction of the printer 150 are the same direction.

<Calculation of Correction Value of Image Density>

Figure 5:
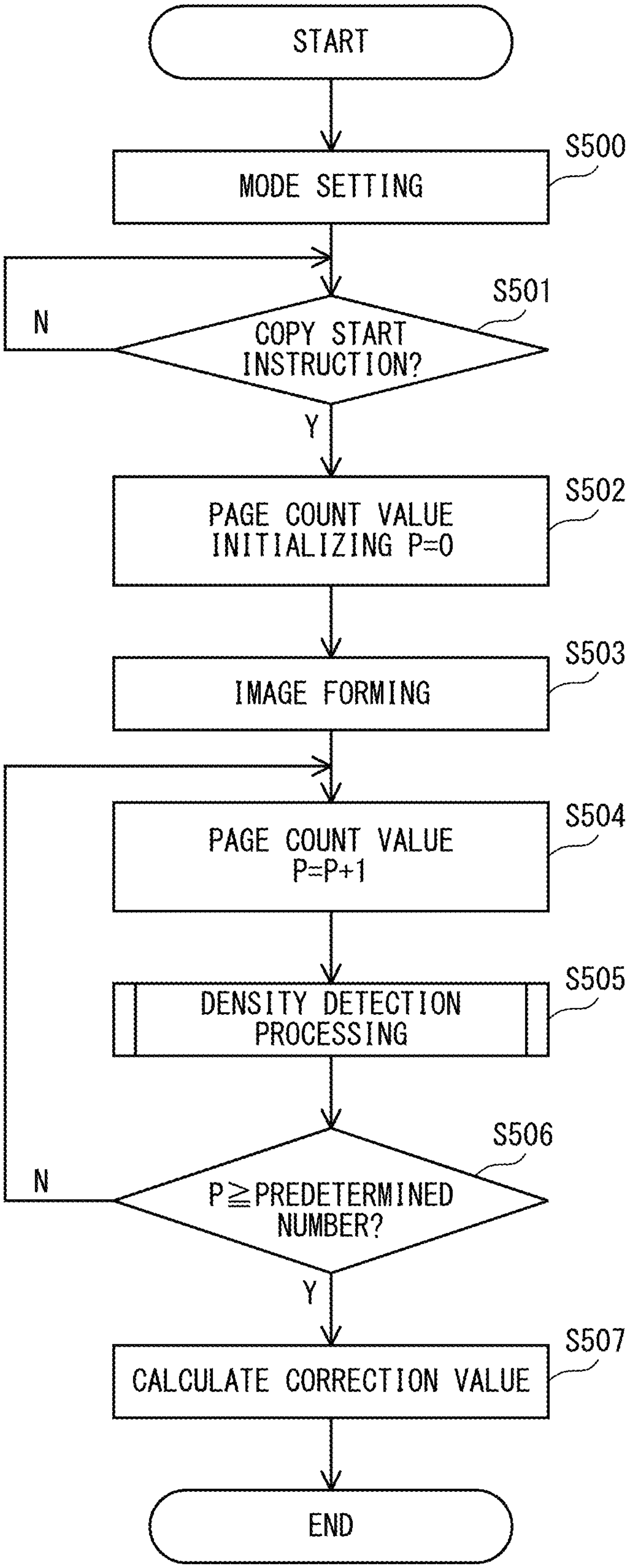
FIG. 5 is a flow chart representing a process for calculating a correction value of an image density.

FIG. 5 is a flowchart representing a process for calculating a correction value of an image density. This process is started when the CPU 114 obtains a print job set by a user by operating the operation panel 120. The print job includes a size of the recording paper and a print mode. Here, processes performed when performing a copy process will be described. In order to perform the copy process, the printer 150 is provided with a scanner (not shown) which reads an image from the document of a copy source. When performing print processing, the CPU 114 obtains the print job from the host computer 101 and performs this process.

Based on the obtained print job, the CPU 114 sets the operation mode required for executing the print job in each device (Step S500). When the user operates the operation panel 120 to instruct the start of copying (Step S501: Y), the CPU 114 obtains the instruction and reads an image from the document by the scanner. The CPU 114 starts an image forming processing based on the image data representing the image read by the scanner. The CPU 114 initializes (P=0) the page count value P representing the number of recording papers from which the image density is detected (Step S502). The CPU 114 forms the user image and the detection image on the recording paper (Step S503). Details will be described later.

When the tip of the recording paper on which the image is formed is detected by the document detection sensor 311 of the reader 160, the CPU 114 increments the page count value P by 1 (Step S504). The output value of the document detection sensor 311 varies by detecting the recording paper (for example, 0→1). The CPU 114 can determine, based on the variation of the output value of the document detection sensor 311, that the tip of the recording paper has been detected by the document detection sensor 311.

In response to the detection of the recording paper by the document detection sensor 311, the CPU 114 detects the image density of the detection image from the recording paper by using the line sensor units 312*a* and 312*b* (Step S505). The details of the image density detection process will be described later. The CPU 114 confirms the page count value P, and repeats the processes of Step S504 to Step S506 until the number of sheets becomes more than or equal to a predetermined number (Step S506: N). In a case where the page count value P becomes more than or equal to a predetermined number (Step S506: Y), the CPU 114 detects the image density based on the reading result of the detection image to calculate a correction value for correcting the image density (Step S507). The correction value is calculated from, for example, a difference in image density which is based on the reading result of the detection image with respect to the reference image density. The predetermined number of sheets is previously set. That is, the correction value of the image density is calculated every time the predetermined number of images forming processes are performed. The correction value of the image density is calculated as described above.

Figure 6:
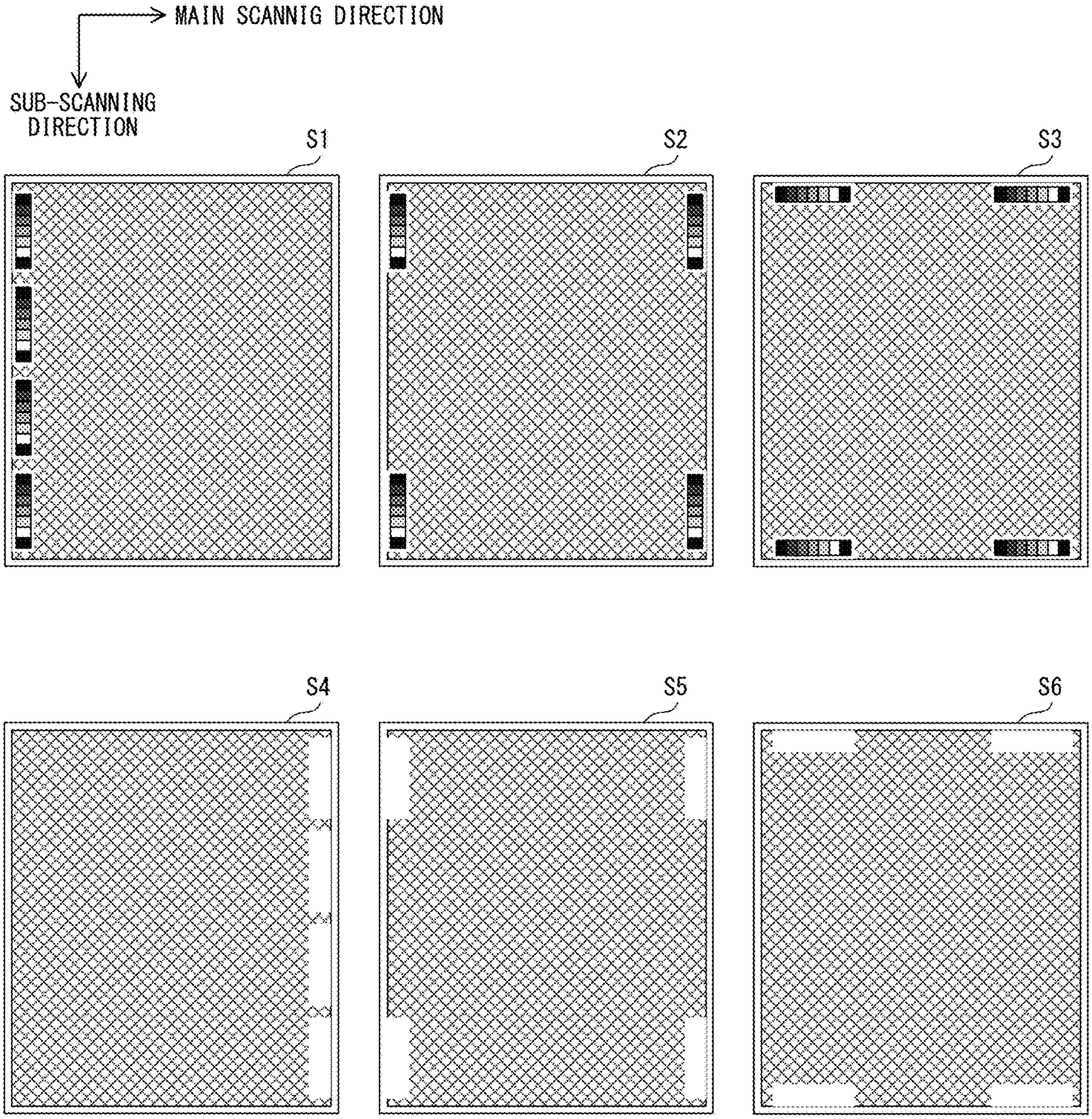
FIG. 6 is an explanatory diagram of a detection image and a user image formed on a recording paper.

FIG. 6 is an exemplary diagram of the user image and the detection image formed on the recording paper by the process of Step S503. The shaded area is an area where the user image is to be printed. The detection image is printed near the edge of the shaded area in the shaded area. The detection image includes a yellow test image, a magenta test image, a cyan test image, and a black test image, respectively. The test image of each color is composed of a plurality of patch images whose image density changes stepwise. The patch image at one end of the test image is a patch image with the highest density. The patch image at the other end is a patch image with the second highest density. If the detection image overlaps the user image, the detection image takes precedence over the user image. That is, the detection image is formed on the user image. The area where the detection image is formed is an area which is to be finally cut and discarded by the finisher 190. Therefore, the detection image does not remain in the final the printed material.

In the detection images of the recording papers S1 to S3, a test image for each color is formed on the edge of the recording paper. The detection image of the recording paper S1 is formed by the test images of each color of yellow, magenta, cyan, and black formed side by side in the sub-scanning direction along one side of the main scanning direction of the recording paper. The detection image of the recording paper S2 is formed by the test images of each two colors formed side by side in the sub-scanning on both sides of the main scanning direction of the recording paper. The detection image of the recording paper S3 is formed by the test images of each two colors formed side by side in the main scanning on both sides of the sub-scanning direction of the recording paper.

The recording paper S4 is the back surface of the recording paper S1. The recording paper S5 is the back surface of the recording paper S2. The recording paper S6 is the back surface of the recording paper S3. In a case where the user image is formed on the back side of an area where the detection image is formed, the show-through of the user image will affect the detection result of the detection image. Therefore, in this embodiment, as to the surface opposite to the surface on which the detection image is formed, the user image is not formed on an area corresponding to an area where the detection image is formed. In the recording papers S4 to S6, the area is filled in white. In order to suppress the influence of show-through on the detection result of the detection image, such an effect for suppressing the influence of show-through can be expected not only when the area is filled with white, but also when it is filled with black only (solid black). The effect for suppressing the influence of show-through on the detection result of the detection image also can be expected for an image with uniform image density.

<Image Density Detection Process>

Figure 7:
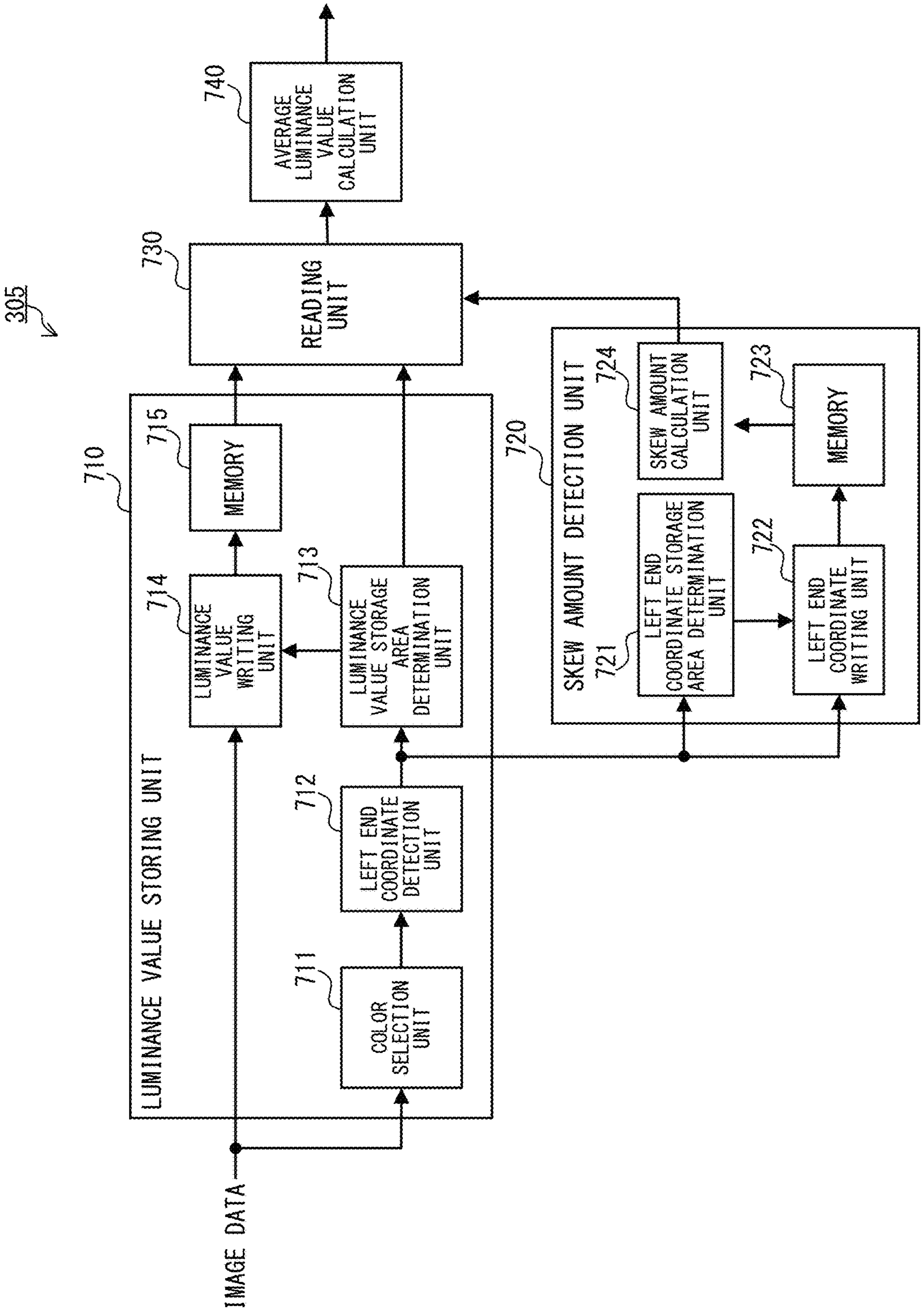
FIG. 7 is a configuration diagram of a density detection processing unit.

FIG. 7 is a configuration diagram of the density detection processing unit 305. The image density detection process of S505 will be described with reference to FIG. 7. The image density detection process by the detection image on the first surface (front surface) of the recording paper and the image density detection process by the detection image on the second surface (back surface) of the recording paper are substantially the same. Therefore, the image density detection process on the front surface will be described here, and the description for the back surface will be omitted.

The density detection processing unit 305 includes a luminance value storing unit 710, a skew amount detection unit 720, a reading unit 730, and the average luminance value calculation unit 740.

The luminance value storing unit 710 stores the image data output from the line sensor unit 312*a*. The luminance value storing unit 710 includes a color selection unit 711, a left end coordinate detection unit 712, a luminance value storage area determination unit 713, a luminance value writing unit 714, and a memory 715.

The color selection unit 711 selects one color of image data from image data of RGB three-color output from the line sensor unit 312*a*. The color to be selected may be any color, however, in order to improve the accuracy of the left end coordinate detection, it is preferable to select a color corresponding to the color of the recording paper.

The left end coordinate detection unit 712 detects a left end coordinate of the detection image from the image data of the color selected by the color selection unit 711. The left end coordinate detection unit 712 detects a left end by determining a threshold value of the image data in order from the first pixel of the main scanning direction. Since the luminance is high on the recording paper and the luminance is low in the detection image, the left end coordinate is detected by detecting a pixel whose luminance value rapidly falls. When the detection accuracy of the left end coordinates is low, the left end coordinate detection unit 712 may detect a rapid fall of the luminance value of a plurality of lines and detect the coordinates from plurality pieces of data.

Figure 8:
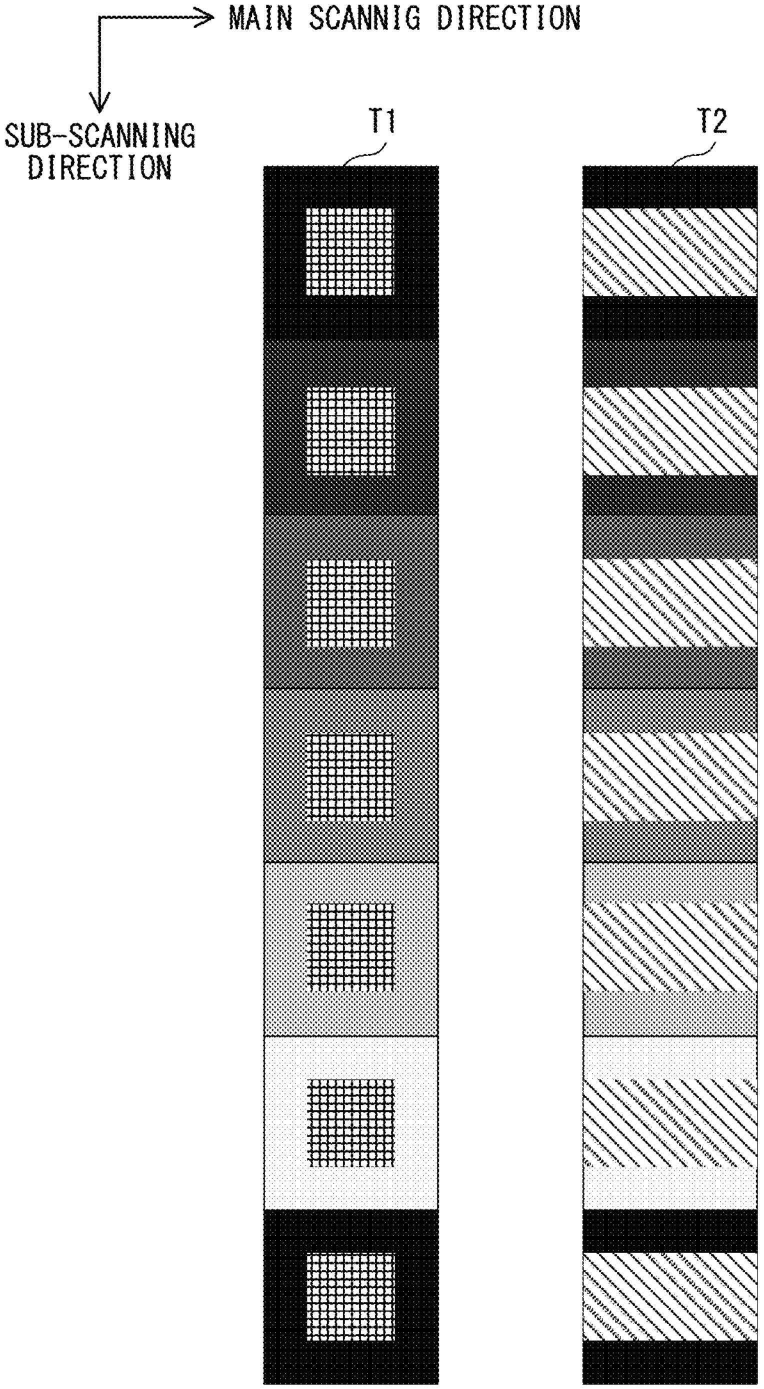
FIG. 8 is an explanatory diagram of a storage range of image data.

The luminance value storage area determination unit 713 determines ranges of the main scanning direction and the sub-scanning direction of the image data to be stored in the memory 715 based on the first left end coordinate (i.e., a coordinate of the upper left corner of the detection image) detected by the left end coordinate detection unit 712 and the size of the detection image. FIG. 8 is an explanatory diagram of a storage range of the image data.

The shaded area of a test image T1 represents an area where the average luminance value for each patch image is calculated. In order to eliminate the influence of flare due to the periphery of the image, the average value is calculated only by the luminance value of a central portion of the patch image, as shown in the test image T1. The shaded area of a test image T2 exemplary represents the storage range determined by the luminance value storage area determination unit 713. The storage range is obtained by extending the area where the average luminance value is calculated in the main scanning direction. The reason why the storage range is extended, with respect to the area where the average luminance value is calculated, is to adjust the area used for calculating the average luminance value based on the amount of skew of the detection image with respect to the line sensor units 312*a* and 312*b*. The reason why the area is not extended to the sub-scanning direction is that the influence due to the amount of skew in the sub-scanning direction is small and negligible. However, the storage range is not limited to the range expanded to the main scanning direction, and the storage range may be expanded to both the main scanning direction and the sub-scanning direction.

The luminance value writing unit 714 writes image data of RGB in the storage range, which is determined by the luminance value storage area determination unit 713, of the main scanning direction and the sub-scanning direction into the memory 715. Since the luminance value storage area determination unit 713 determines the storage range in consideration of the amount of skew, not the entire image area of the detection image, the capacity of the memory 715 used for storing image data is suppressed.

The skew amount detection unit 720 includes a left end coordinate storage area determination unit 721, a left end coordinate writing unit 722, a memory 723, and a skew amount calculation unit 724.

The left end coordinate storage area determination unit 721 determines, based on the first left end coordinates (coordinates of the upper left corner of the detection image) of the patch image detected by the left end coordinate detection unit 712 and the size of the detection image, a range of the left end coordinate in the sub-scanning direction to be stored in the memory 723. The left end coordinate written in the memory 723 by the left end coordinate writing unit 722 is used to detect the amount of skew of the detection image with respect to the line sensor unit 312*a*.

Figure 9:
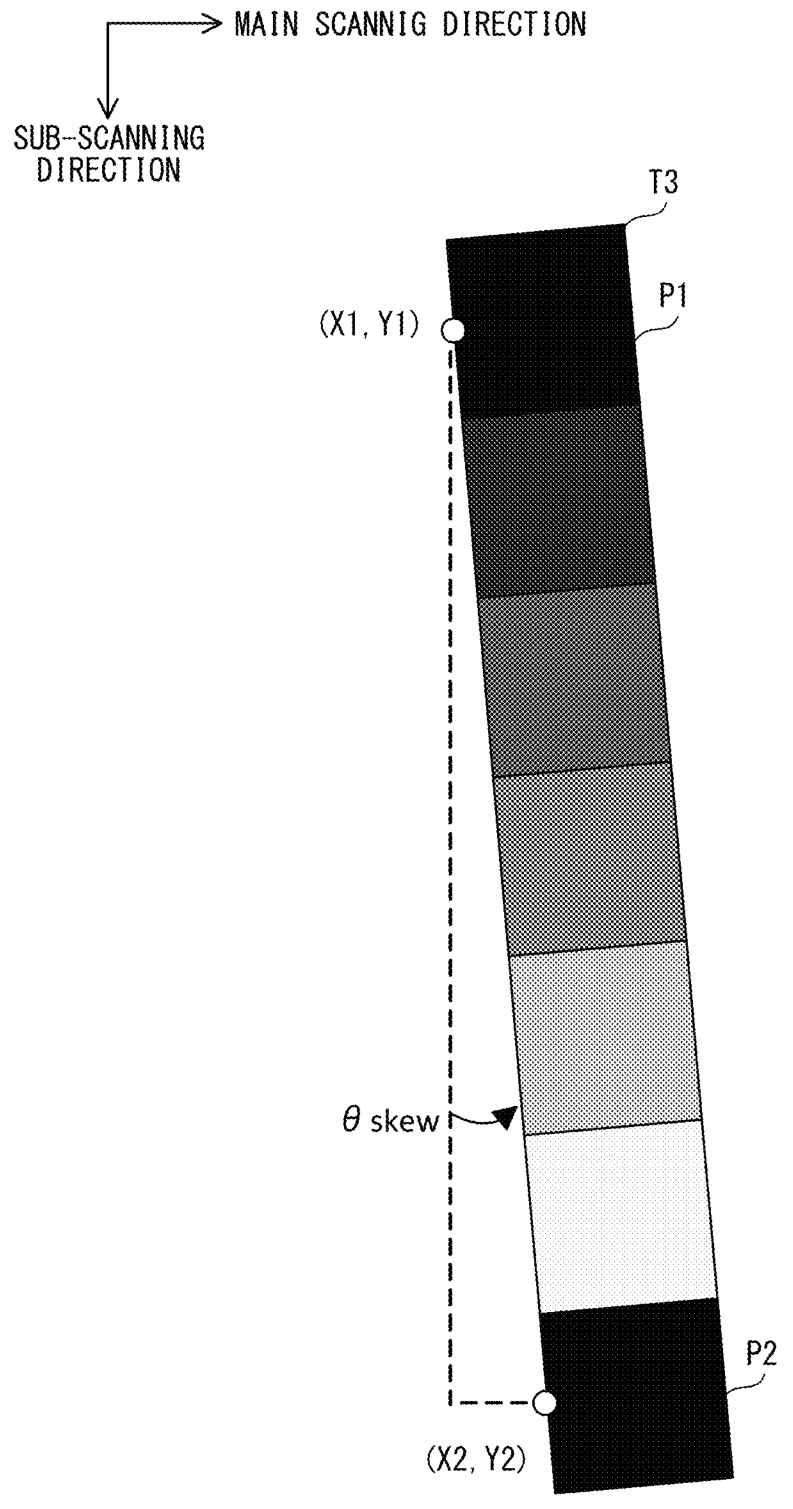
FIG. 9 is an explanatory diagram of an amount of skew of the detection image with respect to a line sensor unit.

FIG. 9 is an explanatory diagram of the amount of skew of the detection image with respect to the line sensor unit 312*a*. At least two left end coordinates are required to detect the skew amount of the detection image. The two left end coordinates are detected using, for example, the first patch image P1 and the last patch image P2 having high densities which allow the detection of the left end coordinates with high accuracy. The range for storing the left end coordinates is two lines, i.e., the first line of the first patch image P1 and the first line of the last patch image P2.

In FIG. 9, two lines passing through the coordinates Y1 and Y2 of the sub-scanning direction are used. The storage area is not limited to the above area, for example, it may be an area including a plurality of continuous lines. By using the average coordinates of the left end coordinates of a plurality of continuous lines, the detection accuracy of the left end coordinates is improved, thus, the detection accuracy of the skew amount is also improved. The left end coordinate writing unit 722 writes the left end coordinate value of the patch image detected by the left end coordinate detection unit 712 in the area, which is determined by the left end coordinate storage area determination unit 721, in the sub-scanning direction, to the memory 723.

The skew amount calculation unit 724 obtains two left end coordinate values from the memory 723 and calculates the skew amount of the detection image on the recording paper with respect to the line sensor unit 312*a*. As shown in FIG. 9, the amount of skew is calculated from two coordinates, i.e., the left end coordinate (X1, Y1) of one line of the first patch image P1 and the left end coordinate (X2, Y2) of one line of the last patch image P2. The skew amount θskew is calculated by, for example, the following formula.

$$\theta skew=(Y1-Y2)/(X1-X2) \qquad \text{<formula 1>}$$

The reading unit 730 determines a range for reading image data based on the skew amount calculated by the skew amount detection unit 720, and reads image data from the memory 715 based on the determined range. The range obtained by adding a deviation amount due to the skew amount to a predetermined range of the main scanning direction is the range for reading the image data. For example, if the predetermined range of the main scanning direction is "A~B" and the deviation amount due to the skew amount is "a", the reading range is "A+a~B+a". The deviation amount "a" due to the amount of skew is expressed as "a=b*(D−C)", where C represents a sub-scanning coordinate of the left end coordinate, D represents a sub-scanning coordinate of a density patch, and an amount of skew represents "b".

The average luminance value calculation unit 740 calculates an average luminance value for each patch image from each of the RGB image data read by the reading unit 730. When the test image is composed of seven patch images as shown in FIG. 8, the average luminance value calculation unit 740 calculates seven average luminance values for each of R, G, and B, thereby total twenty-one average luminance values are calculated.

Figure 10:
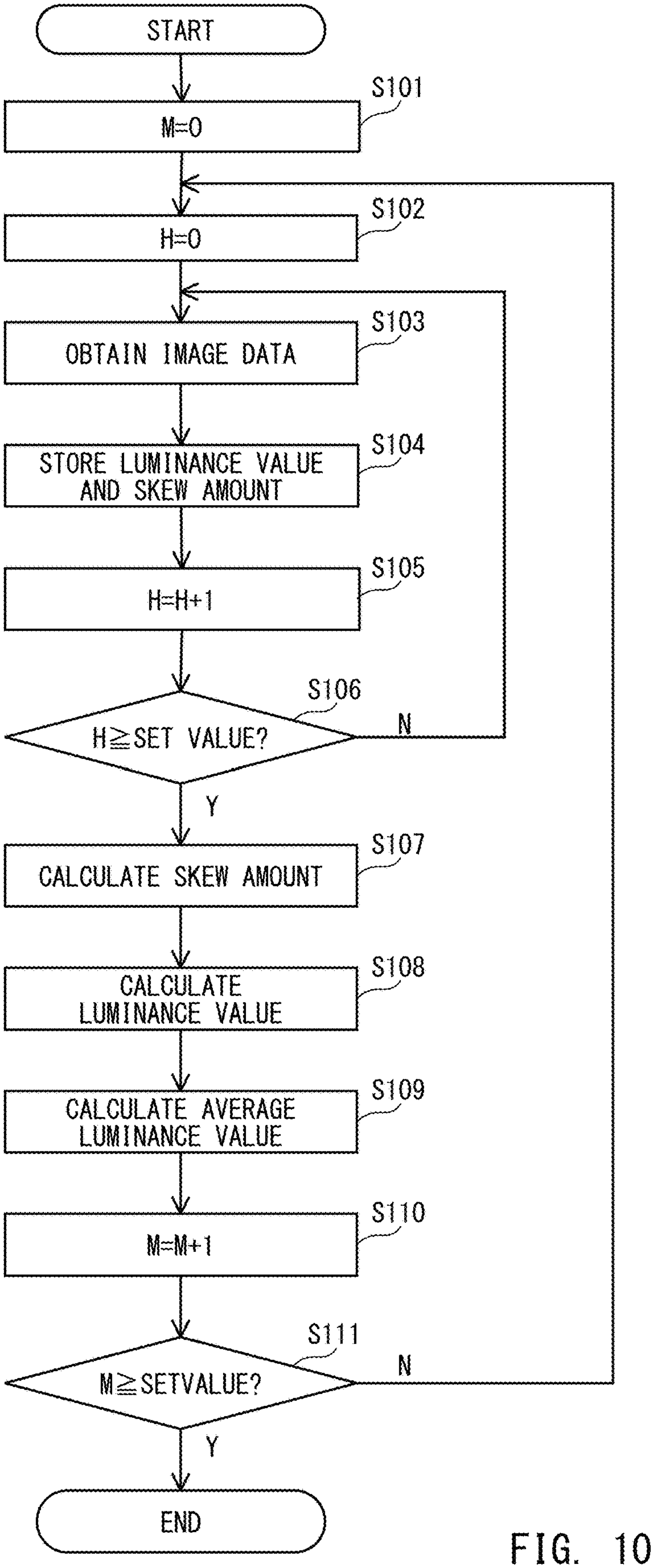
FIG. 10 is a flow chart representing a process of the image density detection.

FIG. 10 is a flowchart representing a process of the image density detection of Step S505 by the density detection processing unit 305. This process is performed every one line cycle.

The density detection processing unit 305 initializes a count value M of the patch image to "0" (Step S101). The count value M of the patch image is used to specify the number of patch images for which image density detection has been performed. When the count value M reaches the number of patch images formed in one sheet of recording paper, the image density detection process ends.

The density detection processing unit 305 initializes the line count value H to "0" (Step S102). The line count value H is used to specify the detection position of the test image of each color of yellow, magenta, cyan, and black. When the line count value H reaches the number of lines in the patch image, the reading of one patch image is completed.

When the initialization of the count value M and the line count value H of the patch image is completed, the line sensor units 312*a* and 312*b* read the detection image under the control of the controller 110. The density detection processing unit 305 obtains image data from the line sensor units 312*a* and 312*b* (Step S103).

The density detection processing unit 305 extracts and stores the luminance value and the skew amount from the obtained image data by the luminance value storing unit 710 and the skew amount detection unit 720 (Step S104). As described above, the luminance value in the region determined by the luminance value storage area determination unit 713 is stored in the memory 715, and the left end coordinates (skew amount) in the region determined by the left end coordinate storage area determination unit 721 is stored in the memory 723.

The density detection processing unit 305 increments the line count value H by 1 (Step S105). The density detection processing unit 305 specifies, by the line count value H, the number of lines detected from the start of obtaining image data. The density detection processing unit 305 determines whether or not the line count value H is equal to or more than a predetermined set value (Step S106). The set value is a predetermined value, and the set value represents the number of lines from the start of obtaining image data until the reading of a single patch image is reliably completed. That is, when the line count value H becomes equal to or more than the set value, it means that the reading of one patch image of the patch images of each color on the recording paper is completed. When the line count value H is less than the set value (Step S106: N), the processes of Step S103 to S106 are repeated until the line count value H becomes equal to or more than the set value.

When the line count value H becomes equal to or more than the set value (Step S106: Y), the density detection processing unit 305 calculates the skew amount of the detection image by the skew amount calculation unit 724 (Step S107). The density detection processing unit 305 determines the range of image data to be read by the reading unit 730 based on the skew amount calculated by the density detection processing unit 305. After that, the density detection processing unit 305 reads the image data (luminance value) within the determined range from the memory 715 (Step S108). The density detection processing unit 305 calculates, by the average luminance value calculation unit 740, the average value (average luminance value) of the luminance value of each patch image from the image data read by the reading unit 730 (Step S109). The density detection processing unit 305 increments the count value M of the patch image by 1 (Step S110).

As described above, the calculation process of the average luminance value of one patch image is completed. The density detection processing unit 305 determines whether or not the count value M of the patch image is equal to the set value which is the number of patch images of the detection image (Step S111). If count value M is not equal to the set value (Step S111: N), the processes of Step S102 to Step S111 are repeated until the count value M of the patch images becomes equal to the number of patch images of the detection image.

When the count value M of the patch image becomes equal to the number of patch images of the detection image (Step S111: Y), the calculation process of the average luminance value for all the patch images on the recording paper is completed, thus the density detection process is completed. The average luminance value for each patch image calculated by the density detection processing unit 305 is transmitted to the controller 110.

As described above, in the image forming apparatus of the present embodiment, when the detection image and the user image are printed on both sides of the recording paper, the area corresponding to the back surface of the detection image is filled with white or the image density thereof is made constant, therefore, the accuracy of the detection result of the detection image can be stabilized. That is, the image forming apparatus 100 of the present embodiment can detect the detection image with high accuracy even when performing double-sided printing. By stabilizing the detection result, the image forming condition by the image forming apparatus 100 can be appropriately adjusted. Therefore, the image forming apparatus 100 can provide printed materials with stable image quality.

In the present embodiment, the configuration in which the printer 150 and the reader 160 are separated has been described, however, the printer 150 and the reader 160 may be configured to be integrated. For example, the line sensor units 312*a* and 312*b* may be provided along the sheet conveyance path 135 or the discharge path 139.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-123903, filed Jul. 20, 2020, which is hereby incorporated by reference herein in its entirety.

What is claimed is:

1. An image forming apparatus, comprising:
- an image forming unit configured to form an image on a sheet based on an image forming condition;
- a reading conveying path in which a sheet having a test image formed by the image forming unit is conveyed from the image forming unit;
- a reader configured to read the test image on the sheet conveyed in the reading conveying path; and
- a controller configured to:
  - generate the image forming condition for adjusting a density of an image to be formed by the image forming unit, based on a reading result of the test image by the reader,
- wherein, in a duplex printing job in which the image forming unit forms images on both surfaces of a sheet, no image is formed on a partial area on the sheet, with the partial area being an area which is a back side of a test image area on which the test image is to be formed.

2. The image forming apparatus according to claim 1, wherein, in a case where the test image is formed on a first surface of the sheet in the duplex printing job, the image forming unit forms, on a second surface opposite to the first surface on the sheet, an image from which a partial image corresponding to the partial area is deleted.

3. The image forming apparatus according to claim 1, wherein, in a case where the test image is formed on a first surface of the sheet in the duplex printing job, the image forming unit forms, on a second surface opposite to the first surface on the sheet, an image obtained by replacing the partial area with a blank area on which no image is to be formed.

4. The image forming apparatus according to claim 1, wherein the image forming unit includes a fixing unit that fixes the image on the sheet by heating the image, wherein the reading conveyance path is arranged downstream of the fixing unit in a conveyance direction in which the sheet is conveyed.

5. The image forming apparatus according to claim 1, wherein the test image comprises a plurality of images each having a different density.

6. The image forming apparatus according to claim 1, wherein the test image comprises a yellow test image, a magenta test image, a cyan test image, and a black test image.

7. The image forming apparatus according to claim 1, wherein the test image is formed at edge portions in a direction orthogonal to a conveyance direction in which the sheet is conveyed.

8. The image forming apparatus according to claim 1, wherein the test image is formed at edge portions in a conveyance direction in which the sheet is conveyed.

9. The image forming apparatus according to claim 1, wherein the image forming unit forms a plurality of the test images on a plurality of sheets, and wherein the controller generates the image forming condition based on reading results, by the reader, of a plurality of the test images on the plurality of sheets.

10. The image forming apparatus according to claim 1, wherein the image forming unit forms, in the duplex print job, an image on a surface on which the test image is to be formed such that the image does not overlap with the test image.

11. A control method for an image forming apparatus, with the image forming apparatus including an image forming unit that forms an image on a sheet based on an image forming condition, a reading conveyance path in which a sheet having a test image formed by the image forming unit is conveyed from the image forming unit, and a reader that reads the test image on the sheet conveyed in the reading path, the control method comprising:
- generating the image forming condition for adjusting a density of an image to be formed by the image forming unit, based on a reading result of the test image by the reader; and
- in a duplex printing job in which the image forming unit forms images on both surfaces of a sheet, not forming an image on a partial area, with the partial area being an area which is a back side of a test image area on which the test image is to be formed.

12. The control method according to claim 11, wherein the control method further comprises, in a case where the test image is formed on a first surface of the sheet in the duplex printing job, forming, by the image forming unit, on a second surface opposite to the first surface on the sheet, an image from which a partial image corresponding to the partial area is deleted.

13. The control method according to claim 11, wherein the control method further comprises, in a case where the test image is formed on a first surface of the sheet in the duplex printing job, forming, by the image forming unit, on a second surface opposite to the first surface on the sheet, an image obtained by replacing the partial area with a blank area on which no image is to be formed.

14. The control method according to claim 11, wherein the control method further comprises fixing, by the image forming unit, the image on the sheet by heating the image, and wherein the reading path is arranged downstream of the fixing unit in a conveyance direction in which the sheet is conveyed.

15. The control method according to claim 11, wherein the test image comprises a plurality of images each having a different density.

16. The control method according to claim 11, wherein the test image comprises a yellow test image, a magenta test image, a cyan test image, and a black test image.

17. The control method according to claim 11, wherein the test image is formed at edge portions in a direction orthogonal to a conveyance direction in which the sheet is conveyed.

18. The control method according to claim 11, wherein the test image is formed at edge portions in a conveyance direction in which the sheet is conveyed.

19. The control method according to claim 11, wherein the control method further comprises forming, by the image forming unit, a plurality of the test images on a plurality of sheets, and wherein the image forming condition is generated based on reading results, by the reader, of a plurality of the test images on the plurality of sheets.

20. The control method according to claim 11, wherein the control method further comprises forming, by the image forming unit, in the duplex print job, an image on a surface on which the test image is to be formed such that the image does not overlap with the test image.

* * * * *